United States Patent [19]

Ogino et al.

[11] Patent Number: 4,918,359
[45] Date of Patent: Apr. 17, 1990

[54] CATHODE RAY TUBE DISPLAY DEVICE

[75] Inventors: Masanori Ogino; Takeo Yamada; Miyuki Ikeda, all of Yokohama, Japan

[73] Assignee: Hitachi, Ltd., Tokyo, Japan

[21] Appl. No.: 335,434

[22] Filed: Apr. 10, 1989

[30] Foreign Application Priority Data

Apr. 11, 1988 [JP] Japan .................................. 63-87109

[51] Int. Cl.⁴ ........................ H01J 29/70; H01J 29/76
[52] U.S. Cl. .................................................... 315/397
[58] Field of Search ............................... 315/396, 397

[56] References Cited

U.S. PATENT DOCUMENTS 3,774,068 11/1973 Yasumatsuya .
3,786,303 1/1974 Hilburn .
4,188,567 2/1980 Monroe ................................. 315/396
4,238,713 12/1980 Moles .................................... 315/397

Primary Examiner—Theodore M. Blum
Attorney, Agent, or Firm—Antonelli, Terry & Wands

[57] ABSTRACT

A vertical deflection circuit used in a cathode ray tube display device for shortening a vertical blanking period is disclosed which includes back-flow blocking diode means for preventing an oscillating current from flowing backward to a vertical push-pull output amplifier circuit in the vertical blanking period, resonating capacitor means, and electrostatic energy supplying means for energizing a fly-back pulse. The resonating capacitor means is provided to generate resonance due to the capacitance of the capacitor means and the inductance of a vertical deflection coil, on the basis of the electromagnetic energy of the vertical deflection coil at a time immediately before a retrace line starts from the bottom of display screen, thereby producing a fly-back pulse. The back-flow blocking diode means prevents the fly-back pulse from flowing backward to the vertical output circuit, that is, prevents the fly-back pulse from de-energizing the output of the vertical output circuit. According to the above vertical deflection circuit, the power consumption in a vertical retrace operation is reduced, and a ratio of the vertical blanking period to a vertical scanning period can be made small. Accordingly, an effective scanning time is increased, and it becomes possible to display information precisely.

6 Claims, 5 Drawing Sheets

CATHODE RAY TUBE DISPLAY DEVICE

BACKGROUND OF THE INVENTION

The present invention relates to a vertical deflection circuit for use in a display device having a cathode ray tube, and more particularly to a vertical deflection circuit which can shorten a vertical blanking period and is small in power consumption.

In a conventional vertical deflection circuit, as described, for example, on page 157 of a Japanese Publication entitled "Gendai Karah-terebi gijitsu (Modern Television Technology)" edited by Television Technical Committee and published by Ohmusha, a vertical-power-source changeover circuit is used to change the source voltage of the vertical deflection circuit over to a voltage from an additional power source in the vertical blanking period.

Thus, in the prior art, complicated, expensive circuit means is required which supplies electric energy to the vertical deflection circuit in the blanking period, and moreover power loss in a vertical retrace operation is increased. Further, a ratio of the vertical blanking period to a vertical scanning period is as high as about 9%, that is, an effective scanning time is short. Accordingly, it is difficult to increase scanning lines, thereby displaying an image precisely.

SUMMARY OF THE INVENTION

It is an object of the present invention to provide a vertical deflection circuit, in which a vertical blanking period is made as short as possible, to reduce the power loss due to a vertical retrace operation and to make a ratio of the vertical blanking period to a vertical scanning period less than or equal to, for example, 2%, thereby increasing an effective scanning time.

It is another object of the present invention to provide a vertical deflection circuit which makes it possible to display information precisely.

A conventional vertical deflection circuit includes a power source which is used only in a vertical blanking period, for the following reason.

FIG. 1 shows the waveform of a vertical deflection current. In FIG. 1, a time t is plotted as abscissa and a current $I_{DY}$ flowing through a deflection coil as ordinate. Further, in FIG. 1, $I_1$ indicates a deflection current corresponding to an uppermost portion (that is, top) of a display screen, and $-I_1$ a deflection current corresponding to a lowermost portion (that is, bottom) of the display screen.

Now, let us assume that at a time $t=0$, the current $I_{DY}$ is reduced to the value $-I_1$ corresponding to the bottom of the display screen, and a vertical output amplifier is detached from a vertical deflection coil having an inductance L, so that the parallel combination of the vertical deflection coil and a capacitor having a capacitance C starts a free oscillation. Then, the current $I_{DY}$ makes a damping oscillation as shown in FIG. 1. The damping oscillation is expressed by the following equation:

$$I_{DY}(t) \approx -I_1 e^{\frac{-rt}{2L}} \cos \frac{t}{\sqrt{LC}} \quad (1)$$

where r indicates the internal resistance of the deflection coil.

As is well known, a ratio $L/r$ is about 600 μsec for an ordinary display device. Now, let us express the current $I_{DY}$ at a time when a half period $T_2$ has elapsed by $I_2$. The current $I_2$ is given as follows:

$$I_2 \equiv I_{DY}(T_2) \approx +I_1 e^{\frac{-rT_2}{2L}} \quad (2)$$

Now, let us suppose that the half period $T_2$ is 160 μsec. Then, a current ratio $I_2/I_1$ is given by the following formula:

$$\frac{I_2}{I_1} \approx e^{\frac{-160 \mu sec}{600 \mu sec \times 2}} \approx 1 - 0.13 \quad (3)$$

As can be seen from the formula (3), when the current flowing through the deflection coil is caused to make a free oscillation immediately after a scanning line has reached the bottom of the display screen, the current cannot return to the current value $I_1$ necessary for scanning the uppermost portion of the display screen, because of the power loss due to the internal resistance of the deflection coil.

A conventional vertical deflection circuit includes an additional power source used only in a vertical blanking period for compensating the above power loss.

In order to attain the above-mentioned objects, according to the present invention, there is provided a vertical deflection circuit which comprises back-flow blocking diode means for preventing an oscillating current from flowing backward to a vertical push-pull output amplifier circuit in a blanking period, resonating capacitor means, and electrostatic energy supplying means for energizing a fly-back pulse.

The resonating capacitor means is provided to generate resonance due to the capacitance of the resonating capacitor means and the inductance of a vertical deflection coil, on the basis of the electromagnetic energy of the vertical deflection coil at a time immediately before a retrace line starts from the bottom of a display screen, thereby producing a fly-back pulse. The back-flow blocking diode means prevents the fly-back pulse from flowing backward to the vertical output circuit, that is, prevents the fly-back pulse from de-energizing the output of the vertical output circuit.

Accordingly, even in a vertical scanning period, the vertical output circuit can be operated on the same low source voltage as in the effective scanning period. While, a fly-back voltage at the resonating capacitor means is reduced in the blanking period, because of the Joule loss due to the internal resistance of the deflection coil, but the reduction in fly-back voltage is compensated by the electrostatic energy supplying means for energizing the fly-back pulse. The increased electrostatic energy of the resonating capacitor means is converted into the electromagnetic energy of the vertical deflection coil in the latter half of the blanking period, and the above electromagnetic energy produces a deflection current corresponding to the top of the display screen. The deflection current thus obtained is opposite in polarity to the deflection current at a time immediately before the retrace line starts, and the former current can be made greater in magnitude then the latter current.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 2:
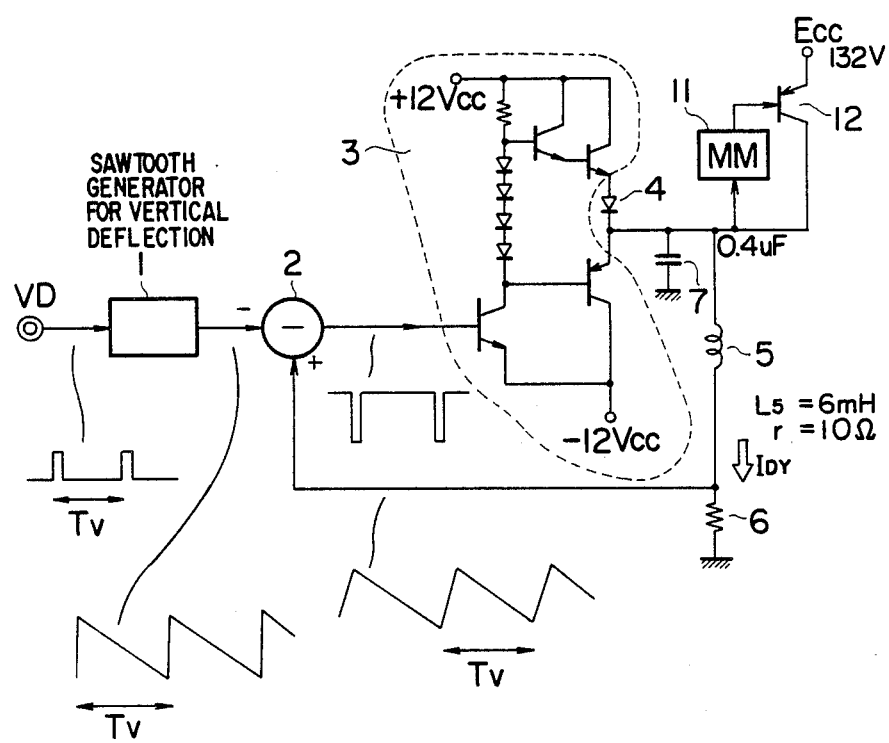
FIG. 2 is a circuit diagram showing a first embodiment of a vertical deflection circuit according to the present invention.

FIG. 2 is a circuit diagram showing a first embodiment of a vertical deflection circuit according to the present invention. In FIG. 2, reference numeral 1 designates a well-known sawtooth generator applied with a vertical drive signal VD (namely, vertical synchronizing signal) for delivering a sawtooth wave having a vertical period of about 16 msec, 2 a subtracter, 3 a well-known single-ended push-pull otput circuit formed of the combination of a pnp transistor and an npn transistor, 4 a back-flow blocking diode, 5 a vertical deflection coil, 6 a resistor for detecting a current flowing through the deflection coil 5, and 7 a resonating capacitor.

As shown in FIG. 2, a feedback circuit is formed so that a voltage waveform detected by the resistor 6 is equal to the output of the sawtooth generator 1. Further, in FIG. 2, reference numeral 11 designates a monostable multivibrator MM, and 12 a transistor.

The gist of the present embodiment resides in a retrace operation energizing circuit made up of the back-flow blocking diode 4, the resonating capacitor 7, the MM 11 and the transistor 12.

The operation of each circuit element will be explained below. In order to facilitate the following explanation, let us assume that various elements have values shown in FIG. 2, that is, let us assume that the deflection coil 5 has an inductance $L_5$ of 6 mH and an internal resistance r of 10Ω, that the deflection current $I_{DY}$ flowing through the deflection coil 5 varies in a range from +1A to −1A, and that the resonating capacitor 7 has a capacitance $C_7$ of 0.4 μF. Then, various time intervals are determined as follows:

$$\left.\begin{array}{l}\sqrt{L_5 C_7} = \sqrt{6\ mH \cdot 0.4\ \mu F} \approx 50\ \mu sec \\ \text{blanking period} = \pi \sqrt{L_5 C_7} \approx 160\ \mu sec \\ \frac{L}{r} = \frac{6\ mH}{10\ \Omega} = 600\ \mu sec \end{array}\right\} \quad (4)$$

Figure 1:
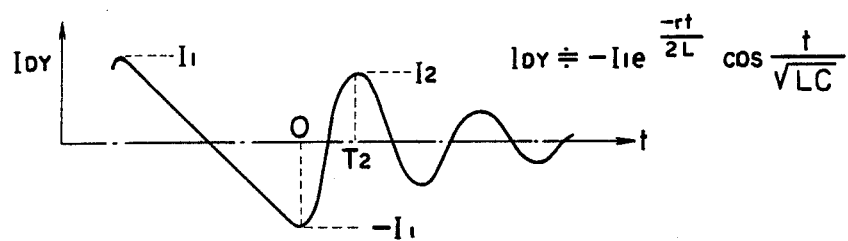
FIG. 1 is a waveform chart which shows the waveform of a vertical deflection current to explain the principle of the present invention.

Thus, the half period $T_2$ of FIG. 1 is 160 μsec, and it is known from the formula (3) that the current ratio $I_2/I_1$ is substantially equal to (1−0.13). Further, the amplitude $V_{OP}$ of a retrace flyback pulse is given as follows:

$$V_{OP} \approx \sqrt{\frac{L}{C}}\ I_1 \times e^{-\frac{r}{2L} \times \frac{T_1}{2}} = \sqrt{\frac{6\ mH}{0.4\ \mu F}}\ 1A \left(1 - \frac{0.13}{2}\right) \approx 115\ V \quad (5)$$

In the present embodiment, in order to make the current ratio $I_2/I_1$ equal to one, the above amplitude $V_{OP}$ is multiplied by 1/(1−0.13) as follows:

$$115\ V \times 1/(1-0.13) \approx 132\ V \quad (6)$$

For this purpose, the retrace operation energizing circuit including the MM 11 and the transistor 12 operates in the following manner.

Figure 3:
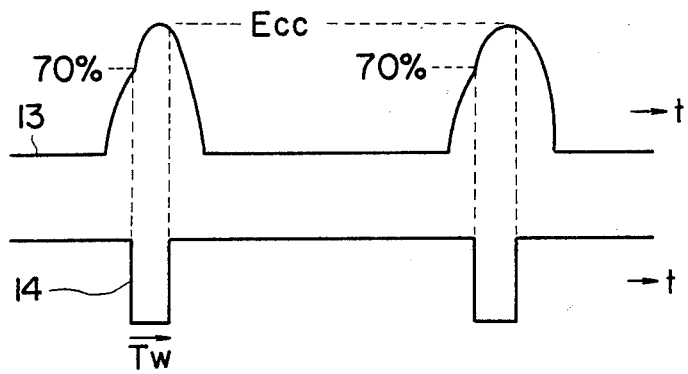
FIG. 3 is a waveform chart for explaining the operation of the first embodiment of FIG. 2.

FIG. 3 is a waveform chart for explaining the operation of the present embodiment. Reference numeral 13 in FIG. 3 designates the waveform of a fly-back pulse. Referring to FIG. 3, when the voltage value of an input fly-back pulse exceeds about 70 percent of a peak value, the MM 11 of FIG. 2 delivers a pulse 14 having a pulse width $T_W$. The pulse width $T_W$ is set to about 25% of a vertical blanking period which is determined by the width of the input fly-back pulse. For example, the pulse width $T_W$ is set to about 40 μsec. The transistor 12 is turned on by the pulse 14 from the MM 11, to supply electrostatic energy to the resonating capacitor 12. A source voltage $V_{CC}$ for the transistor 12 is set to about 132 V, on the basis of the formula (6).

Thus, energy which is supplied to the resonating capacitor 7 for one vertical scanning period, is given as follows:

$$E^2_{cc} C_7/2 - (0.7 E_{cc})^2 C_7/2 \approx 1.7\ mJ \quad (7)$$

Since the vertical scanning period is about 17 msec., the mean energizing power is given by the following equation:

$$1.7\ mj/17\ msec = 0.1\ W \quad (8)$$

That is, electric power as small as about 0.1 W is sufficient to energize the resonating capacitor 7. While, in the prior art, the back-flow blocking diode 4 of FIG. 2 is not provided. Hence, in the vertical blanking period, the power supply circuit for the capacitor 7 is changed over to a different high-tension power source, and thus a power of 1 W or more is consumed.

Further, in the present embodiment, the vertical blanking period is about 160 msec., and a ratio of the vertical blanking period to the vertical scanning period is about 1%. While, in the prior art, a ratio of the vertical blanking period to the vertical scanning period is about 5%. Thus, according to the present embodiment, the above ratio is about one-fifth that in the prior art, that is, a large amount of information can be displayed on a display screen.

Figure 4:
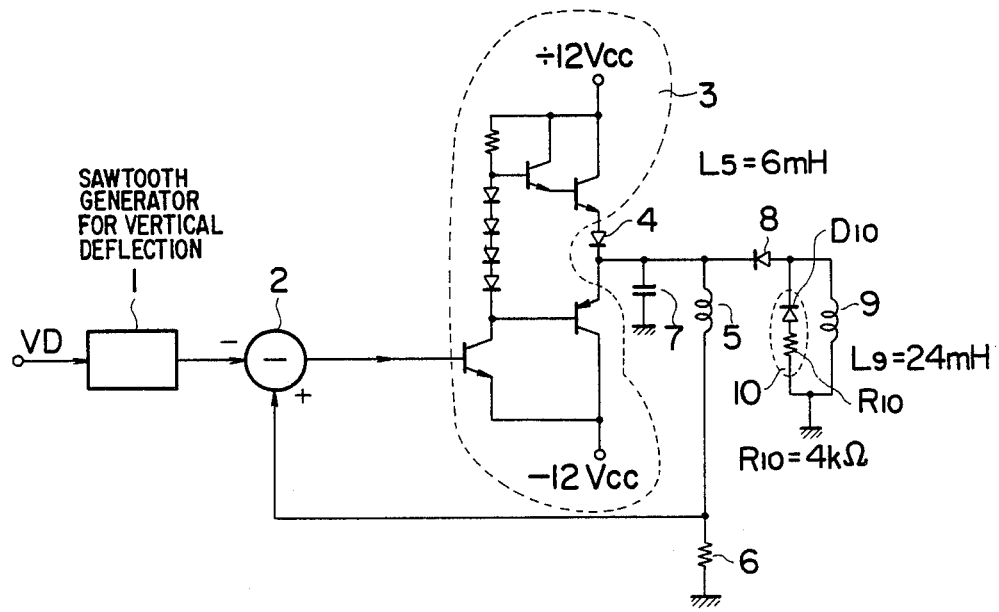
FIG. 4 is a circuit diagram showing a second embodiment of a vertical deflection circuit according to the present invention.

FIG. 4 is a circuit diagram showing a second embodiment of a vertical deflection circuit according to the present invention. In FIG. 4, reference numeral 8 designates a diode, 9 an inductor, and 10 a parasitic-oscillation absorbing circuit formed of a series-combination of a diode $D_{10}$ and a resistor $R_{10}$. Further, in FIG. 4, the same reference numerals as in FIG. 2 designate like parts.

Referring to FIG. 4, the diode 8 is put into a conductive state in the latter half of a vertical scanning period, since the cathode potential of the diode 8 becomes negative. Thus, electromagnetic energy is stored in the inductor 9. The inductance $L_9$ of the inductor 9 is made about four times larger than that of the deflection coil 5, that is, is set to about 24 mH.

Electromagnetic energy which has been stored in the inductor 9 at a time a scanning line reaches the bottom of the display screen, is given by the following equation:

$$\frac{L_9 \times I_9^2}{2} = \frac{4L_5 \times \left(\frac{I_1}{4}\right)^2}{2} \quad (9)$$

$$= \frac{L_5 I_1^2}{2} \times \frac{1}{4} \approx 0.75 \ mJ$$

The electromagnetic energy stored in the inductor 9 and the electromagnetic energy stored in the deflection coil 5 are both converted into the electrostatic energy of the resonating capacitor 7 in the first half of the vertical blanking period. The pulse voltage $V_{OP}$ at the capacitor 7 is given as follows:

$$\frac{C_7 V_{OP}^2}{2} = \left(\frac{L_5 I_1^2}{2} + \frac{L_9 I_9^2}{2}\right) \cdot (1 - 0.13) \quad (10)$$

$$\therefore V_{OP} = \sqrt{\frac{L_5}{C_7}} \cdot \sqrt{1 + \frac{1}{4}} \left(1 \frac{0.13}{2}\right) \times 1A = 128 \ V \quad (11)$$

The pulse voltage $V_{OP}$ (= 128 V) is nearly equal to 132 V shown in the formula (6). The above electrostatic energy is converted into the electromagnetic energy of the deflection coil 5 in the latter half of the vertical blanking period. Thus, a deflection current for scanning the top of the display screen can be obtained. Further, the parasitic-oscillation absorbing circuit 10 is formed of the series combination of the diode $D_{10}$ and the resistor $R_{10}$, to prevent or attenuate parasitic oscillation which is generated by the resonance due to the inductance and parasitic capacitance of the inductor 9 in the latter half of the vertical blanking period on the basis of the remaining electromagnetic energy of the inductor 9. The resistance of the resistor $R_{10}$ is set to about 4 KΩ.

In the above explanation, the embodiments capable of reducing a ratio of a vertical blanking period to a vertical scanning period to a very small value (for example, 1%) have been shown. However, when the capacitance $C_7$ of the resonating capacitor 7 is made large, the embodiments of FIGS. 2 and 4 can provide a vertical deflection circuit having the above ratio nearly equal to 5%.

As is evident from the above explanation based upon the damping oscillation of FIG. 1, the present invention cannot dispense with the back-flow blocking diode 4 and the resonating capacitor 7 each connected to the push-pull output circuit 3.

Figure 5:
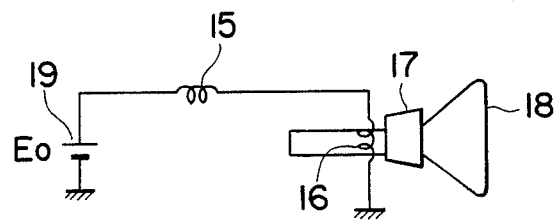
FIG. 5 is an explanatory view of a third embodiment of a vertical deflection circuit according to the present invention.

FIG. 5 is an explanatory view of a third embodiment of a vertical deflection circuit according to the present invention. In FIG. 5, reference numeral 18 designates a cathode ray tube (CRT), 17 a main deflecting yoke, 16 an auxiliary deflecting coil, 15 a choke coil, and 19 a D.C. power source. The auxiliary deflection coil 16 may be wound around the core of the main deflecting yoke 17 so as to form the secondary winding for the vertical deflection coil 5, or may be wound around the core of an additional yoke. The choke coil 15 prevents a deflection current from flowing through an auxiliary circuit which is made up of the circuit elements 15, 16 and 19, on the basis of the linkage of the magnetic line of force from the main deflecting yoke 17 with the auxiliary deflection coil 16. Thus, only a D.C. current from the D.C. power source 19 is supplied to the auxiliary deflection coil 16. The current flowing through the auxiliary deflection coil 16 deflects an electron beam in a direction toward the top of a display screen. The above current is determined so that the amount of auxiliary deflection due to this current is substantially equal to the amount of deflection corresponding to one-half the difference between the current $I_1$ and the current $I_2$ (that is, $\Delta = (I_1 - I_2)/2$). Then, the auxiliary circuit of FIG. 5 can produce an effect similar to that of a retrace operation energizing circuit shown in each of FIGS. 2 and 4. It is needless to say that the third embodiment includes the back-flow blocking diode 4 and resonating capacitor 7 shown in FIGS. 2 and 4, though the diode 4 and the capacitor 7 are not shown in FIG. 5. Further, it is to be noted that each of fourth to seventh embodiments mentioned later includes the back-flow blocking diode 4 and the resonating capacitor 7, though these elements are not always shown in corresponding drawings.

Further, in FIG. 5, the retrace operation energizing circuit made up of the elements 15, 16 and 19 may be replaced by a permanent magnet which is mounted on the neck portion of the cathode ray tube 18 so that the electron beam is deflected in the upward direction by an amount corresponding to $\Delta = (I_1 - I_2)/2$. In this case, the same effect as in the third embodiment can be obtained.

Figure 6:
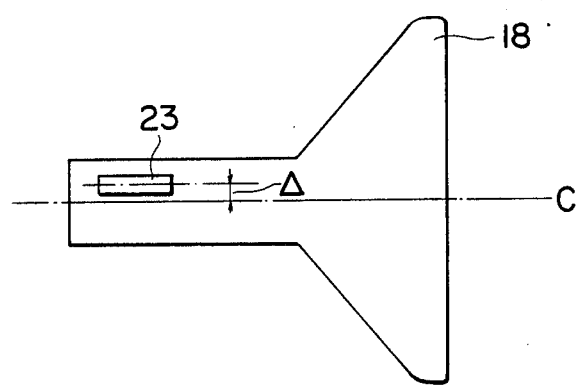
FIG. 6 is an explanatory view of a fourth embodiment of a vertical deflection circuit according to the present invention.

FIG. 6 is an explanatory view of a fourth embodiment of a vertical deflection circuit according to the present invention. In the present embodiment, an electron gun 23 is inclined at a predetermined angle with the center axis C so that an electron beam is moved on the display screen in an upward direction by an amount corresponding to the current difference $\Delta = (I_1 - I_2)/2$. The present embodiment can produce the same effect as in the third embodiment.

Figure 7:
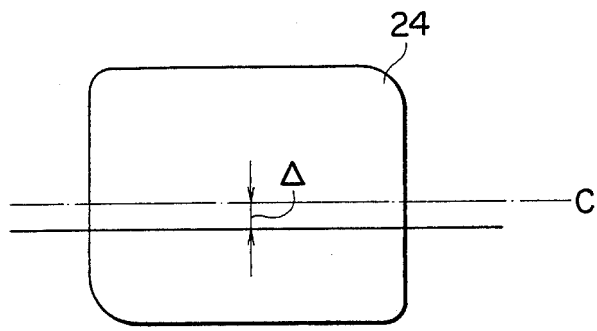
FIG. 7 is an explanatory view of a fifth embodiment of a vertical deflection circuit according to the present invention.

FIG. 7 is an explanatory view of a fifth embodiment of a vertical deflection circuit according to the present invention. In the present embodiment, the display screen (namely, fluorescent screen) 24 of the cathode ray tube 18 is formed so that the horizontal center line of display screen 24 is placed over the center axis C of the neck portion and spaced apart therefrom a distance equal to the displacement of the electron beam on the display screen corresponding to the current difference $\Delta = (I_1 - I_2)/2$. The present embodiment can produce the same effect as in the fourth embodiment of FIG. 6.

In the embodiments of FIGS. 2 and 4, the output part of the push-pull amplifier is made up of two transistors, each of which uses a voltage source electrode as an output electrode. Alternatively, either or both of two transistors may use a current source electrode as an output electrode, so as to form a push-pull configuration.

Figure 8:
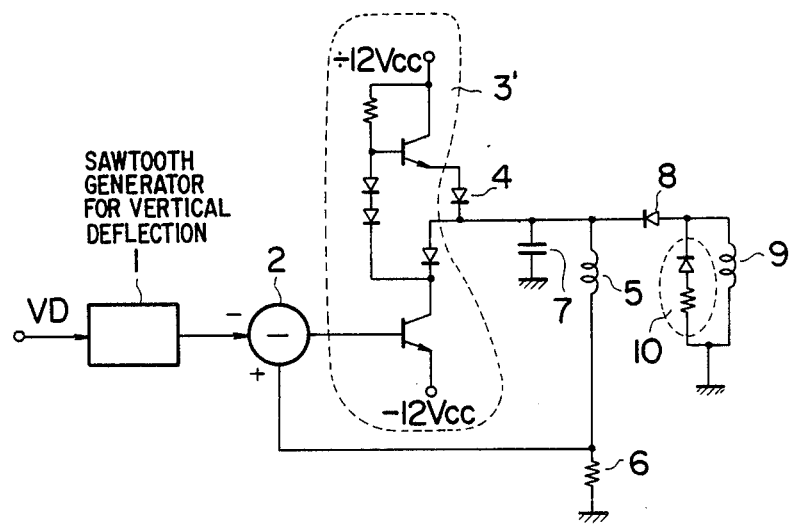
FIG. 8 is a circuit diagram showing a sixth embodiment of a vertical deflection circuit according to the present invention.

FIG. 8 is a circuit diagram showing a sixth embodiment of a vertical deflection circuit according to the present invention which embodiment uses a vertical output amplifier circuit having the above push-pull configuration. In FIG. 8, reference numeral 3' designates a shunt-regulated push-pull output amplifier circuit, and the same reference numerals as in FIG. 4 designate like parts.

Figure 9:
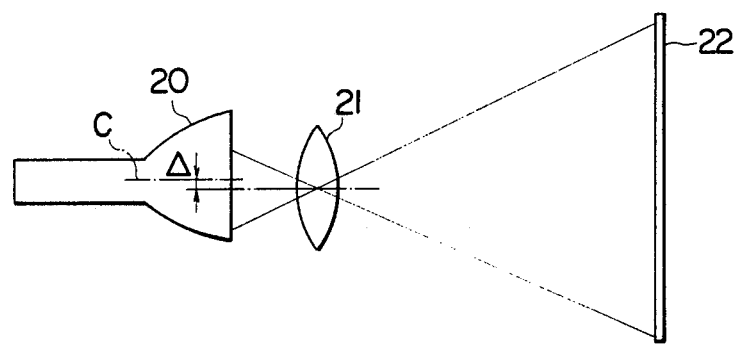
FIG. 9 is an explanatory view of a seventh embodiment of a vertical deflection circuit according to the present invention.

FIG. 9 is an explanatory view of a seventh embodiment of a vertical deflection circuit according to the present invention which embodiment is used in a projection display device. In FIG. 9, reference numeral 20 designates a projection cathode ray tube, 21 a projection lens, and 22a projection screen.

Referring to FIG. 9, the optical axis of the projection lens 21 is placed over the center axis C of an electron gun provided in the projection cathode ray tube 20 so as to be spaced apart from the center axis C a distance equal to the displacement of the electron beam on the display screen of the tube 20 corresponding to the current difference $\Delta = (I_1 - I_2)/2$. The present embodiment can produce the same effect as in the first to sixth embodiments.

As has been explained in the foregoing, according to the present invention, there is provided a vertical deflection circuit, in which a vertical blanking period can be made short to reduce power loss due to a vertical retrace operation, and to make small a ratio of the vertical blanking period to a vertical scanning period. Thus, a vertical deflection circuit according to the present invention makes it possible to display a large amount of information precisely.

We claim:

1. A vertical deflection circuit used for the projection cathode ray tube of a projection display device and including a vertical deflection coil, a push-pull amplifier circuit for amplifying a vertical deflection signal, and a sawtooth generator for vertical deflection, the projection display device being provided with the projection cathode ray tube, projection lens means, and projection screen means, the optical axis of the projection lens means being deviated from the center axis of the electron gun of the projection cathode ray tube in a direction from the center axis toward the end point of a vertical scanning operation on the display screen of the projection cathode ray tube, the vertical deflection circuit comprising:

a back-flow blocking diode connected in series with the output part of the push-pull amplifier circuit so that an output current from the push-pull amplifier circuit can flow through the diode at the starting time of a vertical scanning operation for the projection cathode ray tube; and a resonating capacitor connected in parallel to the vertical deflection coil so that the connecting point of the resonating capacitor and the vertical deflection coil is connected to the current outputting terminal of the back-flow blocking diode, for generating a fly-back pulse in cooperation with the inductance of the vertical deflection coil on the basis of the electromagnetic energy of the vertical deflection coil at the end of the vertical scanning operation, the fly-back pulse being cut off by the back-flow blocking diode.

2. A cathode ray tube display device including a vertical deflection circuit having a vertical deflection coil, a push-pull amplifier circuit for amplifying a vertical deflection signal, and a sawtooth generator for vertical deflection, the vertical deflection circuit comprising:

a back-flow blocking diode connected in series with an output part of the push-pull amplifier circuit so that current for the push-pull amplifier circuit can flow through the back-flow blocking diode at a starting time of a vertical scanning operation for a display screen of the cathode ray tube display device;

a resonating capacitor connected in parallel to the vertical deflection coil so that the connecting point of the resonating capacitor and the vertical deflection coil is connected to a current outputting terminal of the back-flow blocking diode, for generating a fly-back pulse in cooperation with the inductance of the vertical deflection coil on the basis of the electromagnetic energy of the vertical deflection coil at the end of the vertical scanning operation, the fly-back pulse being cut off by the back-flow blocking diode, and the current through vertical deflection coil at the start of the fly-back operation being different from and greater than that at the end of the fly-back operation, the current difference between the current at the start and at the end of the fly-back operation causing geometrical asymmetry in a displayed raster;

means for compensating the geometrical asymmetry; and a resistor inserted in series with the vertical deflection coil for detecting a current flowing through the vertical deflection coil, and means providing a negative feed-back path for a voltage across the resistor.

3. A cathode ray tube display device according to claim 2, wherein the compensating means to compensate the asymmetry includes a structure wherein the horizontal center line of a display screen of the cathode ray tube is placed below the height of a free beam spot position which corresponds to no current-flow in the vertical deflection coil.

4. A cathode ray tube display device according to claim 2, wherein the compensating means to compensate for the asymmetry includes an auxiliary deflection means for shifting a free beam spot position of the cathode ray tube display device in a direction toward a starting point of the vertical scanning operation by a predetermined amount.

5. A cathode ray tube display device according to claim 2, wherein the compensating means to compensate for the asymmetry includes circuit means for supplying electrostatic energy to the resonating capacitor during the first half of a vertical blanking period, the circuit means including the vertical deflection coil and a current source circuit connected to the resonating capacitor.

6. A cathode ray tube display device according to claim 5, wherein the current source circuit is a composite circuit of an inductor, a first diode, a resistor and a second diode.

* * * * *